(12) United States Patent
Tripp

(10) Patent No.: US 9,727,734 B2
(45) Date of Patent: *Aug. 8, 2017

(54) CUSTOMIZING A SECURITY REPORT USING STATIC ANALYSIS

(71) Applicant: International Business Machines Corporation, Armonk, NY (US)

(72) Inventor: Omer Tripp, Har-Adar (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 36 days.

This patent is subject to a terminal disclaimer.

(21) Appl. No.: 13/972,391

(22) Filed: Aug. 21, 2013

(65) Prior Publication Data

US 2014/0090070 A1    Mar. 27, 2014

Related U.S. Application Data

(63) Continuation of application No. 13/628,392, filed on Sep. 27, 2012.

(51) Int. Cl.
    *G06F 21/57*         (2013.01)

(52) U.S. Cl.
    CPC ...... *G06F 21/577* (2013.01); *G06F 2221/033* (2013.01)

(58) Field of Classification Search
    CPC ... G05F 9/44; G05F 9/445; G05F 9/45; G05F 9/455; G06F 9/455; G06F 9/44; G06F 9/445; G06F 9/45
    USPC .................................... 726/25; 717/132, 156
    See application file for complete search history.

(56) References Cited

U.S. PATENT DOCUMENTS

| 6,381,739 | B1 | 4/2002 | Breternitz et al. |
| 6,848,100 | B1 | 1/2005 | Wu et al. |
| 7,886,272 | B1 | 2/2011 | Episkopos et al. |
| 2005/0044538 | A1 | 2/2005 | Mantripragada |
| 2008/0143723 | A1* | 6/2008 | Zhou ............................ 345/440 |

(Continued)

OTHER PUBLICATIONS

Ariel Felner. "Position Paper: Dijkstra's Algorithm versus Uniform Cost Search or a Case Against Dijkstra's Algorithm" Proceedings ofthe Fourth International Symposium on Combinatiorial Search (SoCS-2011) Jul. 15-16, 2011 (pp. 47-51) https://www.aaai.org/ocs/index.php/SOCS/SOCS11/paper/viewFile/4017/4357.*

(Continued)

*Primary Examiner* — Joseph P Hirl
*Assistant Examiner* — Thomas Gyorfi
(74) *Attorney, Agent, or Firm* — Cuenot, Forsythe & Kim, LLC

(57) ABSTRACT

Respective edge weights are assigned to edges of a plurality of paths in a control flow graph representing a model of data flow of a computer program. Edge weights assigned to each edge are processed to determine a total edge weight for the respective paths, the total edge weight for a respective path being a sum of the edge weights assigned to the respective edges of the path. At least one path in the control flow graph whose total edge weight satisfies a particular total edge weight criteria can be identified, and the control flow graph can be updated to indicate to the user the at least one path in the control flow graph whose total edge weight satisfies the particular total edge weight criteria. The updated control flow graph can be presented to the user.

10 Claims, 3 Drawing Sheets

(56) References Cited

U.S. PATENT DOCUMENTS

2008/0222614 A1    9/2008   Chilimbi et al.
2008/0282035 A1   11/2008   Hundt et al.
2009/0055813 A1    2/2009   Haber et al.
2013/0326625 A1   12/2013   Anderson et al.

OTHER PUBLICATIONS

"Uniform-cost search" entry from Wikipedia, dated Jun. 8, 2011 (3 pages) http://en.wikipedia.org/w/index.php?title=Uniform-cost_search&oldid=433256622.*

E.W. Dijkstra. "A Note on Two Problems in Connexion with Graphs" Numerische Mathematik 1, pp. 269-271 (1959) http://www-m3.ma.tum.de/twiki/pub/MN0506/WebHome/dijkstra.pdf.*

Yu, K. et al., "Program Sifting: Select Property-related Functions for Language-based Static Analysis," 16th Annual APSEC '09 Asia-Pacific Software Engineering Conference, Dec. 1-3, 2009, pp. 275-282.

"Breadth-first Search," [online] Wikipedia, the Free Encyclopedia, Sep. 24, 2012 [retrieved Sep. 26, 2012] retrieved from the Internet: <http://en.wikipedia.org/wiki/Breadth-first_search>, 4 pgs.

"Uniform-cost Search," [online] Wikipedia, the Free Encyclopedia, Aug. 29, 2012 [retrieved Sep. 26, 2012] retrieved from the Internet: <http://en.wikipedia.org/wiki/Uniform-cost_search>, 4 pgs.

* cited by examiner

CUSTOMIZING A SECURITY REPORT USING STATIC ANALYSIS

CROSS-REFERENCE TO RELATED APPLICATIONS

This application is a Continuation of U.S. application Ser. No. 13/628,392, filed on Sep. 27, 2012, the entirety of which is incorporated herein by reference.

BACKGROUND

The present invention relates to computer information systems and, more particular, to security.

With continued proliferation of the Internet, and the expanding use of web applications, website security is an ongoing concern; unscrupulous users sometimes initiate cyber-attacks against websites with the intent to undermine or compromise the function of computer-based systems. Examples of such cyber-attacks include cross-site scripting (XSS) attacks, SQL injection, remote file inclusion, code injection, file system attacks, and command executions. To validate the security of web applications, application developers oftentimes perform a static analysis on the computer program code of the web applications to identify potential security vulnerabilities, and then implement changes to the computer program code to address such vulnerabilities.

One form of static analysis is known as taint analysis. A taint analysis searches for paths leading from statements that read user-provided data, which are known as sources, to statements that perform security-sensitive operations, which are known as sinks. When a path is discovered that does not go through a downgrading operation (e.g., sanitization of validation), then that path may represent a security vulnerability.

BRIEF SUMMARY

One or more embodiments disclosed within this specification relate to customizing a security report. An embodiment can include assigning respective edge weights to edges of a plurality of paths in a control flow graph representing a model of data flow of a computer program. Via a processor, edge weights assigned to each edge can be processed to determine a total edge weight for the respective paths, the total edge weight for a respective path being a sum of the edge weights assigned to the respective edges of the path. At least one path in the control flow graph whose total edge weight satisfies a particular total edge weight criteria can be identified, and the control flow graph can be updated to indicate to the user the at least one path in the control flow graph whose total edge weight satisfies the particular total edge weight criteria. The updated control flow graph can be presented to the user.

Another embodiment can include identifying at least one node in a control flow graph associated with a user, the control flow graph representing a model of data flow of a computer program. Respective edge weights to can be assigned edges of a plurality of paths in a control flow graph, each edge beginning at or ending at the at least one identified node. Via a processor, edge weights assigned to each edge can be processed to determine a total edge weight for the respective paths, the total edge weight for a respective path being a sum of the edge weights assigned to the respective edges of the path. At least one path in the control flow graph whose total edge weight satisfies a particular total edge weight criteria, and that comprises at least one edge beginning at or ending at the at least one identified node, can be identified. The control flow graph can be updated to indicate to the user the at least one path in the control flow graph whose total edge weight satisfies the particular total edge weight criteria and that comprises at least one edge beginning at or ending at the at least one identified node. The updated control flow graph can be presented to the user.

DETAILED DESCRIPTION

Figure 1:
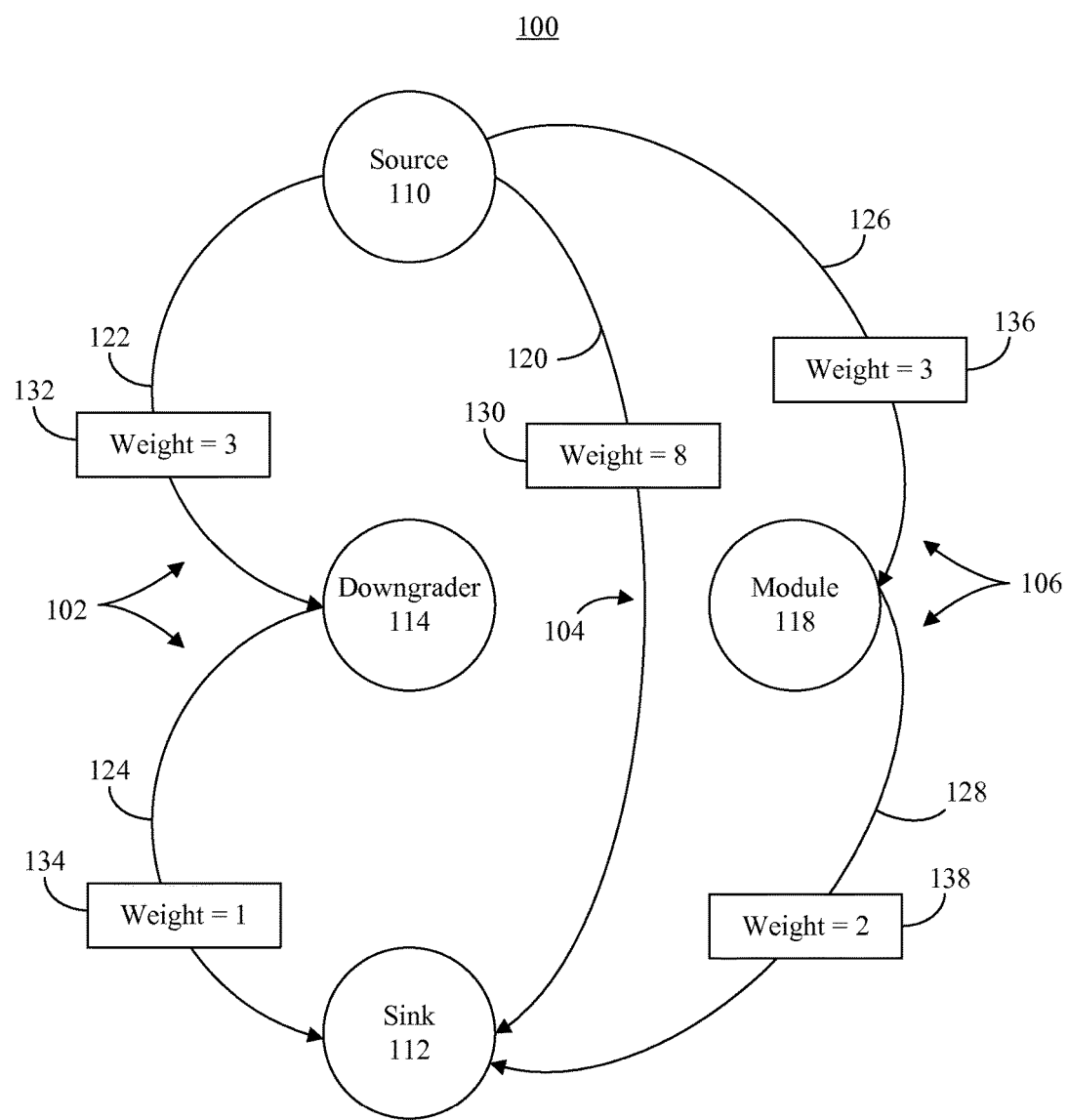
FIG. 1 depicts a control flow graph in accordance with one embodiment disclosed within this specification.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied, e.g., stored, thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 depicts a control flow graph 100 in accordance with one embodiment disclosed within this specification. The control flow graph 100 can be generated by a security scanning application which applies a static analysis to analyze a computer program to identify potential security vulnerabilities in the computer program. The control flow graph 100 represents a model of data flow of the computer program during execution of the computer program, and identifies those parts of the computer program to which a particular value assigned to a variable might propagate. The control flow graph 100 can be presented to a user as a security report. Moreover, the model represented by the control flow graph 100 can be analyzed, and customized, as described herein to facilitate identification of various security vulnerabilities.

The control flow graph 100 represents of one or more data flow paths (hereinafter "paths") 102, 104, 106 that a value, such as user-provided data, assigned to a variable might traverse through the computer program during its execution. The control flow graph 100 can include various nodes that represent statements, functions, methods and/or modules of the computer program. In illustration, respective nodes of the control flow graph 100 can represent a source 110, a sink 112 and a downgrader 114. The control flow graph 100 also can include a myriad of other nodes, such as node representing a module (or function, method or statement) 118.

The source 110 is a statement in the computer program code that reads user-provided data assigns that data to a variable which is processed by the computer program. For example, in a web application, the source 110 can read a user-provided HTTP parameter, a parameter in a uniform resource identifier (URI) (e.g., a uniform resource locator (URL)) field, alphanumeric text and/or symbols, data from a file or database, or the like. The sink 116 is a statement in the computer program code that performs a security-sensitive operation on the user-provided data. For example, the sink 116 can read the user-provided data, store the user-provided data to a database (e.g., create or update a database record), initiate one or more operations corresponding to the user-provided data (e.g., delete a database record, retrieve data, etc.), read data from a file indicated by the user-provided data, render content indicated by the user-provided data to a response HTML message generated by a web application, or the like. The downgrader 114 is function or module configured to endorse, validate and/or sanitize the user-provided data, which may be considered to be untrusted data. For example, the downgrader 114 can validate HTML encoding provided in the user-provided data, check for malicious patterns or content in the user-provided data, or the like. The process of the downgrader 114 endorsing, validating and/or sanitizing the user-provided data generally is referred to as downgrading the data.

During static analysis of the computer program, the security analysis application analyses the control flow graph 100 or, more precisely, the computer model represented by the control flow graph 100, to determine whether there are potential paths, during execution of the computer program, from the source 110 to the sink 112 without the user-provided data being downgraded by the downgrader 114. One such path 104 is indicated in the control flow graph 100 by an edge 120. This path generally is undesirable, and may indicate a security vulnerability in the computer program. In this regard, the edge 120 can represent a witness to a security vulnerability, and thus may be referred to as a "witness." The edge 120, or witness, can be reported to a user. In contrast, edges 122, 124 represent a proper path 102 in which the user-provided data is downgraded by the downgrader 114 before being consumed by the sink 112.

Edges 126, 128 represent another path 106 from the source 110 to the sink 112 without the user-provided data being downgraded by the downgrader 114. In this path, the user-provided data may be processed by the module 118 before being consumed by the sink 112, but since the module 118 is not a downgrader, such path also represents a witness to a security vulnerability in the computer program.

In accordance with the arrangements described herein, biases can be provided to control the manner in which the paths 102-106 and nodes 110-118 are presented to the user. As used herein, the term "bias" means a user input that is processed by the security analysis application to identify one or more particular features of the control flow graph 100. Such features can be those features particularly of interest to the user.

In illustration, the user can provide one or more biases to identify paths that begin at, end at, or traverse portions of the computer program for which the user is responsible for developing and/or maintaining, and/or assign edge weights to the edges 120-128. Accordingly, the control flow graph 100 can be customized to present to the user information especially relevant to that user. The biases can be applied to the control flow graph 100 as a post processing step applied after the control flow graph 100 is generated, or applied when the control flow graph 100 is generated using static analysis. Either way, portions of the control flow graph 100 identified by processing of the biases can be indicated to the user, for example by accentuating such portions of the control flow graph 100 (e.g., using one or more particular colors to depict the portions, highlighting the portions, etc.), generating an annotated version of the control flow graph 100, generating a version of the control flow graph 100 that includes only those nodes 110-118, paths 102-106 and edges 120-128 identified by processing of the biases, presenting messages or pop-up balloons over the control flow graph 100 identifying such nodes 110-118, paths 102-106 and edges 120-128, or the like.

In one arrangement, the user can specify that paths 102-106 going through one or more specific modules (or functions, methods or statements) are to be identified. The user can specify such biases, for example, by selecting one or more nodes 110-118 of the control flow graph 100, and indicating that paths 102-106 through such nodes 110-118 are to be indicated. In illustration, the user can select one or more nodes 110-118 with a cursor, then access a menu item or control that tags the selected node(s) 110-118 as to be particularly focused upon with respect to indicating particular paths 102-106 traversing the selected node(s) 110-118. The present arrangements are not limited to this example, however, and the user can specify certain paths 102-106 in any other suitable manner. In another arrangement, certain nodes 112-118 can be associated with the user. For example, the user can be assigned to develop and/or maintain certain nodes 112-118, and such nodes can be automatically identified.

Further, the user can input a bias indicating that paths 102-106 that traverse the module 118 are to be identified. Accordingly, the path 106 comprising edges 126, 128 can be identified. The user also can specify that paths which do not go through one or more specific modules (or functions, methods or statements), such as the module 118, are to be identified. Thus, the path comprising the edge 120 can be identified. Further, the user can specify that only witnesses (e.g., paths 104, 106 that do not traverse the downgrader 114) be identified. Accordingly, a user can focus the static analysis to identify witnesses and other paths of particular interest to the user.

The user also can specify that paths 102-106 going through one or more specific downgraders, such as the downgrader 114, are to be identified. Accordingly, the path 102 can be identified to the user. This provides the user an opportunity to analysis the downgrader 114 to determine whether the downgrader 114 is properly endorsing, sanitizing or validating data whose data flow is represented by the path 102. The user also may specify that only paths going through the downgrader 114 and beginning at the source 110, and/or ending and the sink 112, are to be identified, in which case the path 102 can be identified to the user. In another example, if the user specifies that only witnesses beginning at the source 110 and/or ending at the sink 112 are to be identified, the paths 104, 106 can be identified to the user.

The user also can indicate that paths 102-106, or nodes 112-118 within the paths 102-106 (e.g., where edges 120-128 begin or end), that contain regular-expression application program interfaces (APIs), such as string matches, are to be identified. In another arrangement, such paths 102-106 can be identified by default. The following code presents an example of a regular-expression API:

```
String name = request.getParameter("name"); // Source
if (!name.matches(".*javascript:.*")) {
    response.getWriter( ).write("Hello " + name); // Sink
}
```

The edges 120-128 of the paths 102-106 that begin at, end at or traverse the selected nodes 110-118 can be automatically assigned edge weights 132-138. The edge weights 132-138 can be based on the nature of the nodes 110-118 at which the edges 120-128 begin and/or end. For example, the respective edges 120-060 can be annotated with the respective edge weights 132-138. In illustration, the edge 120 beginning at the source 110 and ending at the sink 112 can be assigned greater weight that edges 122, 126 that begin at the source 110 and end at respective nodes 114, 118, thus indicating that the edge 120 corresponds to a path 104 which has a higher level of risk of representing a security vulnerability in the computer program. If a node 110-118 contains a regular-expression API, edges 120-128 beginning at such a node can be automatically assigned relatively high edge weights in comparison to one or more other edges 120-128.

In one arrangement, the user can change one or more of the automatically assigned edge weights to bias presentation of the control flow graph 100 and/or related information in a desired manner. In another arrangement, each of the edges 120-128 can be assigned a default edge weight (e.g., 1), and the user can change one or more of the default edge weights to bias presentation of the control flow graph 100 and/or related information in a desired manner.

Regardless of the manner in which the edge weights 132-138 are assigned, the edge weights 132-138 can be processed to identify various paths 102-106 according to the user biases. Total edge weight for each path 102-106 can be determined using a uniform-cost search (UCS) algorithm that identifies each edge 120-128 for each respective path 102-106, identifies the edge weight 130-138 for each of the respective edges 120-128 and, for each path 102-106, sums the respective edge weights 130-138. Thus, the paths 102-106 can be identified, and filtered, based on their total edge weights. The UCS algorithm can be based on a dynamic-programming algorithm. Thus, the size of the UCS algorithm can be dynamically configured based on the size of the control flow graph, thereby limiting the amount of resources allocated to processing the UCS algorithm.

For instance, by default, the heaviest witness in the control flow graph can be automatically identified, or the user can specify that the path 102-106 with the highest likelihood of representing a security vulnerability, (e.g., the heaviest witness) is to be identified. Again, such paths 102-106 can be filtered to only represent paths 102-106 that begin at, end at, or traverse nodes 110-118 of concern to the user, such as those nodes 110-118 the user is responsible for developing and/or maintaining. As noted, such nodes can be identified by the user, or identified as being associated with the user. Because the edge weight 130 of the edge 120 is 8, and the edge weights 132, 134 of the edges 122, 124 sum to a total of 4 (i.e., 3+1), and the edge weights 136, 138 of the edges 126, 128 sum to a total of 5 (i.e., 3+2), the witness represented by the edge 120 can be considered the heaviest witness and identified to the user. If the user specifies that the heaviest witness is to be identified, the witness (i.e., path 104) represented by the edge 120 can be identified to the user. If the user specifies that the lightest witness is to be identified, the witness (i.e., path 106) represented by the edges 126, 128 can be identified to the user. As noted, since the path 102 traverses the downgrader 114, the path 102 is not considered to be a witness. Nonetheless, if the user specifies that the lightest path is to be identified, the path 102 can be identified to the user, even though the path 102 is not a witness. Further, the user can specify a minimum total edge weight, a maximum total edge weight or a range of total edge weight values and indicate that paths, or perhaps only witnesses, represented by edges 122-128 whose edge weights 132-138 sum to a total edge weight meeting the specified criteria.

For example, if the user specifies that only witnesses having a total edge weight (e.g., sum of individual edges 122-128 for a particular path 102-106) greater than 7 are to be identified. In this case, the path 104 can be identified to the user. If the user specifies that only witnesses having a total edge weight between 2 and 6 are to be identified, the path 106 can be identified to the user. If the user specifies that all paths having a total edge weight between 2 and 6 are to be identified, the paths 102 and 106 can be identified to the user. If the user specifies that only paths traversing the module 118, or that only paths traversing the module 118 and having a total edge weight between 2 and 6 are to be identified, the path 106 can be identified to the user.

In another arrangement, rather than the user specifying the criteria used to select the paths, the criteria can be automatically generated based on user biases. For instance, the user can indicates that "heavy" witnesses or other paths 102-106 are to be identified, the security analysis application can determine criteria for a minimum total edge weight. If the user can indicates that "light" paths 102-106 are to be identified, the security analysis application can determine criteria for a maximum total edge weight. If the user can indicates that "medium" paths 102-106 are to be identified, the security analysis application can determine criteria for a range of total edge weight values. The security analysis application can establish such criteria by evaluating the total edge weights for each of the paths 102-106, and apply statistical processing to arrive at the criteria based on the total edge weights present.

When paths meeting the specified criteria are identified, other paths, and corresponding edges and/or nodes need not be indicated. For example, the control flow graph 100 can be customized (e.g., updated) to remove from view such other paths, edges and nodes, and the updated control flow graph can be presented to the user. Accordingly, the arrangements described herein presents information related to the flow of data through the computer program that is of particular interest to the user in a manner that is easily comprehended by the user, and drive the reporting of paths by the security analysis application through a limited set of milestones. This makes it easier for the user to consolidate and digest information pertaining to related paths and reason about high-level problems governing such paths, thus simplifying coding and debugging of the computer program.

Figure 2:
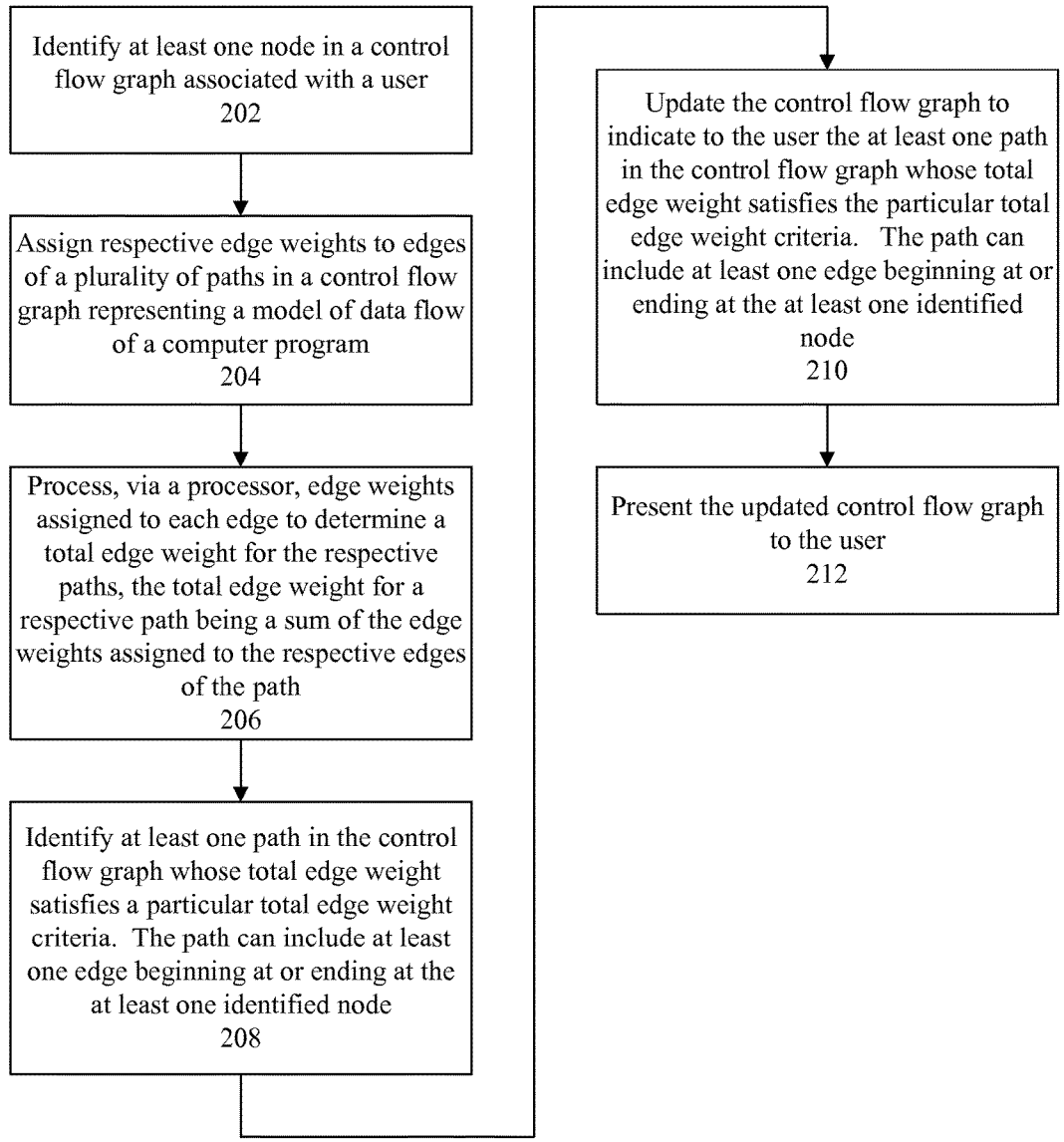
FIG. 2 is a flow chart illustrating a method of customizing a security report in accordance with another embodiment disclosed within this specification.

FIG. 2 is a flow chart illustrating a method of customizing a security report in accordance with another embodiment disclosed within this specification. At step 202, at least one node in a control flow graph associated with a user can be identified. The control flow graph represents a model of data flow of a computer program. The node can be associated with the user in any suitable manner. In illustration, the user can select the node. Thus, the node can be associated with the user based on the user's selection of the node. In another arrangement, the user can be identified as being responsible for maintaining or developing the node, and thus associated with the node. In illustration, the security analysis application can access a data table or other data structure that indicates which nodes in the computer program are assigned to the user, and thus associated with the user.

At step 204, respective edge weights can be assigned to edges of a plurality of paths in the control flow graph. In one arrangement, default edge weights can be initially assigned to each edge of the respective paths in the control flow graph. At least one user input can be received from the user changing a value of at least one of the default edge weights. In another arrangement, the edge weights can be automatically assigned to each edge of the respective paths in the control flow graph. The edge weight automatically assigned to a particular edge can be based on a nature of a node from which the edge begins or a nature of a node at which the edge ends. For example, edges associated with a node containing a regular-expression API can be assigned greater edge weight than other edges in the control flow graph.

At step 206, edge weights assigned to each edge can be processed, via a processor, to determine a total edge weight for the respective paths, the total edge weight for a respective path being a sum of the edge weights assigned to the respective edges of the path. In one arrangement, the total edge weights for the paths can be determined using a UCS algorithm. The UCS algorithm can be dynamically configured based on a size of the control flow graph.

At step 208, at least one path in the control flow graph whose total edge weight satisfies a particular total edge weight criteria. The total edge weight criteria can specify a minimum total edge weight, a maximum total edge weight, or a range of total edge weight values. Further, the path can include at least one edge beginning at or ending at the at least one identified node.

At step 210, the control flow graph can be updated to indicate to the user at least one path in the control flow graph whose total edge weight satisfies the particular total edge weight criteria. Again, the path can include at least one edge beginning at or ending at the at least one identified node. At step 212, the updated control flow graph can be presented to the user.

Figure 3:
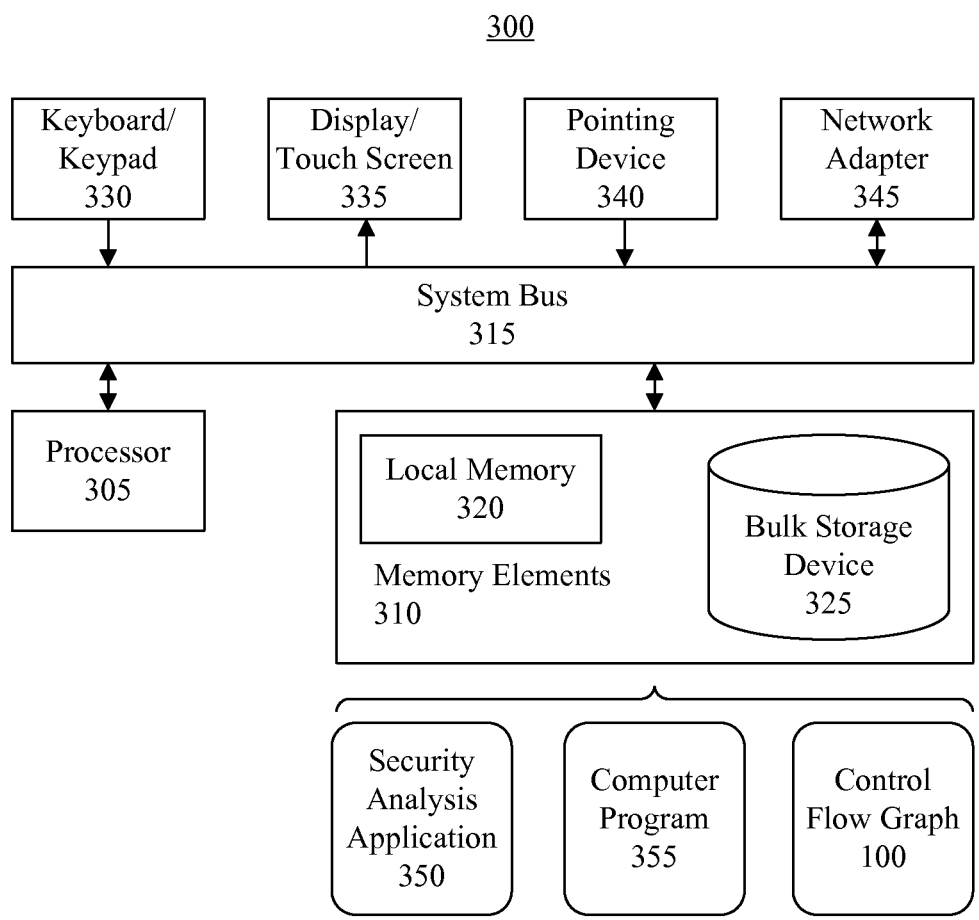
FIG. 3 is a block diagram illustrating a processing system that customizes a security report in accordance with one embodiment disclosed within this specification.

FIG. 3 is a block diagram illustrating a processing system 300 that customizes a security report in accordance with one embodiment disclosed within this specification.

The processing system 300 can include at least one processor 305 coupled to memory elements 310 through a system bus 315 or other suitable circuitry. As such, the processing system 300 can store program code within the memory elements 310. The processor 305 can execute the program code accessed from the memory elements 310 via the system bus 315. It should be appreciated that the processing system 300 can be implemented in the form of any system including a processor and memory that is capable of performing the functions and/or operations described within this specification. For example, the processing system 300 can be implemented as a compute (e.g., a desktop computer, a workstation, a mobile computer, a laptop computer, a tablet computer, a server, or the like), a smart phone, a personal digital assistant, or any other suitable processing system.

The memory elements 310 can include one or more physical memory devices such as, for example, local memory 320 and one or more bulk storage devices 325. Local memory 320 refers to RAM or other non-persistent memory device(s) generally used during actual execution of the program code. The bulk storage device(s) 325 can be implemented as a hard disk drive (HDD), solid state drive (SSD), or other persistent data storage device. The processing system 300 also can include one or more cache memories (not shown) that provide temporary storage of at least some program code in order to reduce the number of times program code must be retrieved from the bulk storage device 325 during execution.

Input/output (I/O) devices such as a keyboard and/or keypad 330, a display and/or touch screen 335, a pointing device 340 and a network adapter 345 can be coupled to the processing system 300. The I/O devices can be coupled to the processing system 300 either directly or through intervening I/O controllers. For example, the display/touchscreen 335 can be coupled to the processing system 300 via a graphics processing unit (GPU), which may be a component of the processor 305 or a discrete device. The network adapter 345 also can be coupled to processing system 300 to enable processing system 300 to become coupled to other systems, computer systems, remote printers, and/or remote storage devices through intervening private or public networks. Modems, cable modems, and Ethernet cards are examples of different types of network adapters 345 that can be used with processing system 300.

As pictured in FIG. 3, the memory elements 310 can store the components of the processing system 300, such as a security analysis application 350. Being implemented in the form of executable program code, the security analysis application 350 can be executed by the processing system 300 and, as such, can be considered part of the processing system 300. In one arrangement, the memory elements 310 can store a computer program 355 analyzed by the security analysis application 350 to determine whether the computer program 355 has security vulnerabilities. In another arrangement, the processing system can access the computer program 355 from another system to which the processing system is communicatively linked, for example via the network adapter 345.

During the security analysis, the security analysis application 350 can generate the control flow graph 100. Further, based on the user inputs providing user biases, (e.g., identification of nodes, edge weights, etc.), the security analysis application 350 can customize (e.g., update) the control flow graph 100 to indicate to the user certain nodes, paths, edges, etc., of interest to the user, for example as described herein. The updated control flow graph 100 can be presented to the user via the display/touchscreen 335. In one embodiment, the security analysis application 350 can be implemented as IBM® Rational® AppScan (IBM and Rational are trademarks of International Business Machines Corporation in the United States, other countries, or both). The present arrangements are not limited in this regard, however.

Like numbers have be used to refer to the same items throughout this specification. The flowchart and block diagram in the Figures illustrate the architecture, functionality, and operation of possible implementations of systems, methods and computer program products according to various embodiments of the present invention. In this regard, each block in the flowchart or block diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagram and/or flowchart illustration, and combinations of blocks in the block diagram and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Reference throughout this specification to "one embodiment," "an embodiment," or similar language means that a particular feature, structure, or characteristic described in connection with the embodiment is included in at least one embodiment disclosed within this specification. Thus, appearances of the phrases "in one embodiment," "in an embodiment," and similar language throughout this specification may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The corresponding structures, materials, acts, and equivalents of all means or step plus function elements in the claims below are intended to include any structure, material, or act for performing the function in combination with other claimed elements as specifically claimed. The description of the embodiments disclosed within this specification have been presented for purposes of illustration and description, but are not intended to be exhaustive or limited to the form disclosed. Many modifications and variations will be apparent to those of ordinary skill in the art without departing from the scope and spirit of the embodiments of the invention. The embodiments were chosen and described in order to best explain the principles of the invention and the practical application, and to enable others of ordinary skill in the art to understand the inventive arrangements for various embodiments with various modifications as are suited to the particular use contemplated.

What is claimed is:

1. A method of customizing a security report, the method comprising:
    performing, by a security analysis application executed by a processor, a static analysis of a computer program and, during the static analysis, generating, by the security analysis application, a control flow graph representing a model of data flow of the computer program and assigning respective edge weights to edges of a plurality of paths in the control flow graph;
    limiting an amount of processing resources allocated to processing a uniform-cost search method by dynamically configuring, by the security analysis application, a size of the uniform-cost search method based on a size of the control flow graph, dynamically configuring the size of the uniform-cost search method based on the size of the control flow graph comprising identifying edges assigned greatest edge weights and limiting the uniform-cost search method to consider only those paths that include the edges assigned the greatest edge weights;
    determining, using the uniform-cost search method executed by the processor, a total edge weight for the considered paths, the total edge weight for a considered path being a sum of the edge weights assigned to the respective edges of the considered path;
    identifying at least one path of the considered paths in the control flow graph whose total edge weight satisfies a particular total edge weight criteria;
    updating the control flow graph to indicate to the user the at least one path in the control flow graph whose total edge weight satisfies the particular total edge weight criteria; and
    presenting, on a display, the updated control flow graph to the user as a customized security report that facilitates identification of security vulnerabilities in the computer program.

2. The method of claim 1, wherein the total edge weight criteria specifies a minimum total edge weight, a maximum total edge weight, or a range of total edge weight values.

3. The method of claim 2, further comprising:
    identifying at least one node in the control flow graph associated with the user;
    wherein identifying at least one path of the considered paths in the control flow graph whose total edge weight satisfies a particular total edge weight criteria comprises:
        identifying at least one path in the control flow graph whose total edge weight satisfies the particular total edge weight criteria, which specifies the minimum total edge weight, the maximum total edge weight or the range of total edge weight values, and that comprises at least one edge beginning at or ending at the at least one identified node; and
    wherein updating the control flow graph to indicate to the user the at least one path in the control flow graph whose total edge weight satisfies the particular total edge weight criteria comprises:
        updating the control flow graph to indicate to the user the at least one path in the control flow graph whose total edge weight satisfies the particular total edge weight criteria and that comprises at least one edge beginning at or ending at the at least one identified node.

4. The method of claim 3, wherein identifying at least one node in the control flow graph associated with the user comprises:
    receiving a user input from the user identifying the at least one node.

5. The method of claim 3, wherein identifying at least one node in the control flow graph associated with the user comprises:
    identifying the user as being responsible for maintaining or developing the at least one node.

6. The method of claim 1, further comprising:
    initially assigning a default edge weight to each edge of the respective paths in the control flow graph; and
    receiving from the user at least one user input changing a value of at least one of the default edge weights.

7. The method of claim 1, further comprising:
    automatically assigning edge weights to each edge of the respective paths in the control flow graph, the edge weight automatically assigned to a particular edge based on a nature of a node from which the edge begins or a nature of a node at which the edge ends.

8. The method of claim 1, wherein processing the edge weights assigned to each edge of the plurality of respective paths in the control flow graph to determine a total edge weight for the respective paths comprises:
    determining the respective total edge weights using a uniform-cost search algorithm.

9. The method of claim 8, further comprising:
    dynamically configuring the uniform-cost search algorithm based on a size of the control flow graph.

10. A method of customizing a security report, the method comprising:
    identifying at least one node in a control flow graph associated with a user, the control flow graph representing a model of data flow of a computer program;
    performing, by a security analysis application executed by a processor, a static analysis of the computer program and, during the static analysis, assigning respective edge weights to edges of a plurality of paths in the control flow graph, each edge beginning at or ending at the at least one identified node;
    limiting an amount of processing resources allocated to processing a uniform-cost search method by dynamically configuring, by the security analysis application, a size of the uniform-cost search method based on a size of the control flow graph, dynamically configuring the size of the uniform-cost search method based on the size of the control flow graph comprising identifying edges assigned greatest edge weights and limiting the uniform-cost search method to consider only those paths that include the edges assigned the greatest edge weights;

determining, using the uniform-cost search method executed by the processor, a total edge weight for the considered paths, the total edge weight for a considered path being a sum of the edge weights assigned to the respective edges of the considered path;

identifying at least one path of the considered paths in the control flow graph whose total edge weight satisfies a particular total edge weight criteria, and that comprises at least one edge beginning at or ending at the at least one identified node;

updating the control flow graph to indicate to the user the at least one path in the control flow graph whose total edge weight satisfies the particular total edge weight criteria and that comprises at least one edge beginning at or ending at the at least one identified node; and presenting, on a display, the updated control flow graph to the user as a customized security report that facilitates identification of security vulnerabilities in the computer program.

* * * * *